June 8, 1937.      C. H. HILL      2,083,379
ELECTRICAL SWITCHGEAR
Filed Sept. 14, 1933
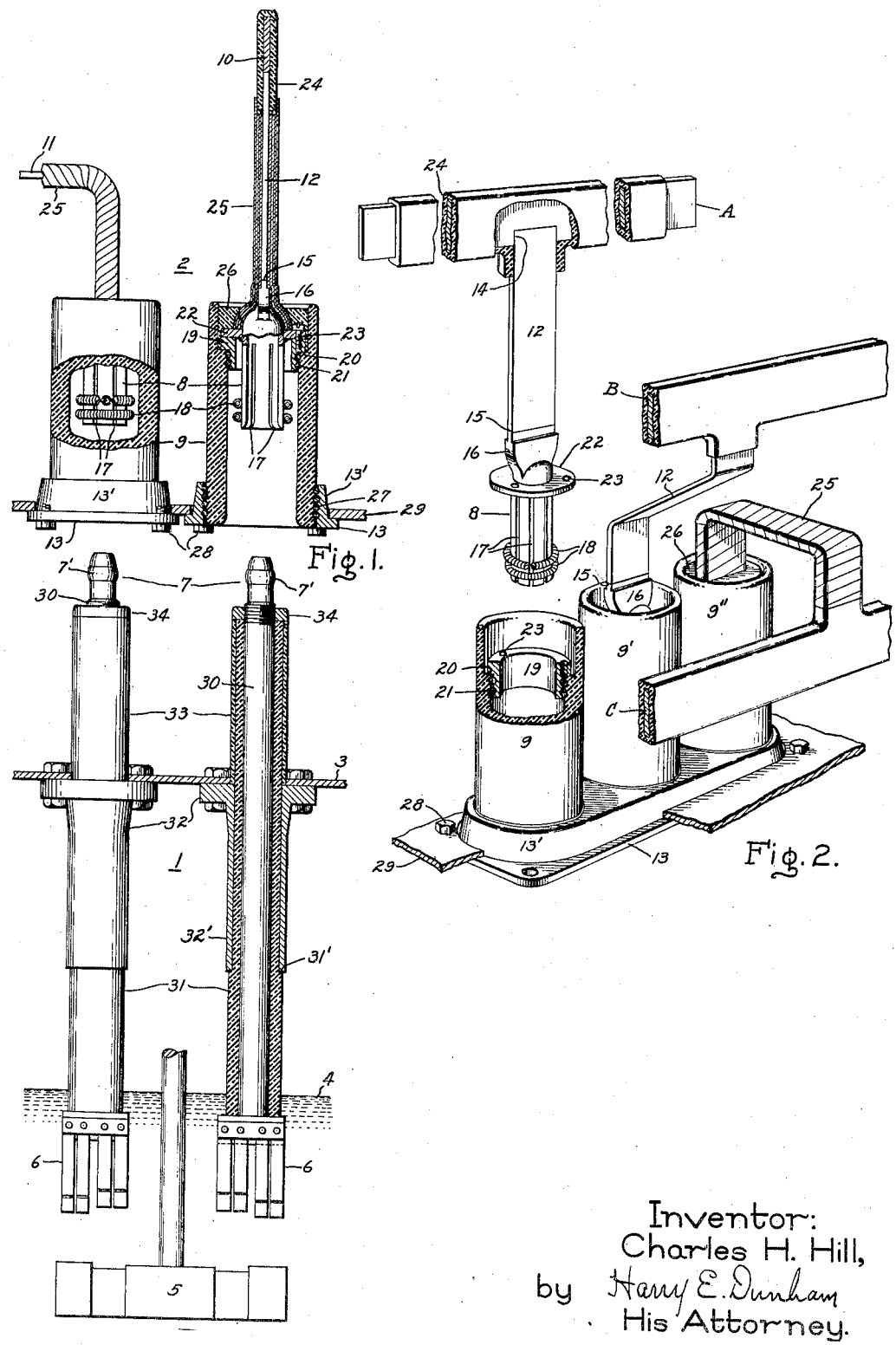
Inventor:
Charles H. Hill,
by Harry E. Dunham
His Attorney.

Patented June 8, 1937

2,083,379

UNITED STATES PATENT OFFICE 2,083,379

ELECTRICAL SWITCHGEAR

Charles H. Hill, Drexel Hill, Pa., assignor to General Electric Company, a corporation of New York Application September 14, 1933, Serial No. 689,423

8 Claims. (Cl. 175—298)

My invention relates to electrical switchgear of the draw-out or drop-down type wherein electrical isolation of a circuit breaker with respect to associated bus bar and other circuits is accomplished by isolating or disconnect contacts which are separated in accordance with bodily movement of said circuit breaker.

A principal object of my invention is the provision of improved electrical switchgear of the aforesaid character wherein the bus bar and disconnect contact structure is simple, rugged, and compact in design and wherein electrical connections of the clamp type are eliminated.

In accordance with one aspect of my invention, the disconnect contact structure is included in an integral, electrically continuous and compact unit incorporated in the stationary bus bar structure or circuit breaker, as the case may be, thereby eliminating entirely all joints and connections subject to oxidation and other factors tending to increase contact resistance.

My invention will be more fully set forth in the following description referring to the accompanying drawing, and the features of novelty which characterize my invention will be pointed out with particularity in the claims annexed to and forming a part of this specification.

Referring to the drawing, Fig. 1 is an elevational view, partly in section of electrical switchgear in the disconnected position thereof embodying the present invention, and Fig. 2 is an exploded view, partly in section, of the bus bar and disconnect contact unit partially shown in Fig. 1.

In Fig. 1 there is indicated the general combination of elements constituting electrical switchgear of the draw-out type including a circuit breaker I vertically movable so as to be in connected and disconnected positions with respect to the stationary associated circuits comprising bus bar and stationary disconnect contact structure 2. The circuit breaker I is shown as of the fluid-break or oil type comprising a tank, the upper wall or cover of which is indicated at 3, containing a body of oil 4 in which are immersed the movable bridging contact 5 and coacting stationary contacts 6. The contacts 6 are each electrically connected to the movable disconnect plug contact 7 hereinafter described.

In the disconnected position shown, the circuit breaker I is electrically isolated from the stationary bus bar and disconnect contact structure 2 by reason of the separation of the plug contacts 7 and the coacting stationary socket contacts 8. The contacts 8 which are mounted within cylindrical insulating shells 9 open at the lower ends thereof for receiving the plug contacts 7 are each connected, respectively, to a live bus bar 10 and a branch or feeder circuit 11 so that in the plugged-in or connected position the circuit breaker I controls the feeder circuit in a well known manner.

For a more complete description of the details of construction and method of assembly of the bus bar and associated stationary disconnect contact structure, reference is had to Fig. 2 which is an exploded view indicating progressive steps of assembling as an article of manufacture. It will be understood, of course, that although a three phase arrangement is illustrated, the present invention is not limited to any particular number of phases.

The unit illustrated by Fig. 2 comprises the individual phase bus bar sections A, B and C, each bus bar section being integrally connected to its associated disconnect socket contact 8, in a manner hereinafter described, by a conductor strip 12. The disconnect socket contact 8 is rigidly mounted within its associated insulating shell 9, the other phase insulating shells 9' and 9" being rigidly mounted in and supported by a plate or base member 13 common to the above-described polyphase arrangement. A complete structural unit is thereby provided for assembly with respect to electrical switchgear, particularly of the metal clad type, wherein each circuit breaker controlled feeder unit comprises a separate metal supporting frame and housing.

The phase bus bars in this type of switchgear are divided into sections so that they may be joined together as continuous conductors when a number of metal clad units are placed side by side to form in a well known manner a bus and switch station.

Referring more particularly to the detailed construction of the bus bar and stationary disconnect contact unit, the bus bar section A, taking this phase as a representative example, comprises a flat bus bar, composed of suitable conducting material as copper, at the lower edge of which is integrally joined at 14, as by welding or brazing, the conductor strip 12. The strip 12 is preferably of substantially the same thickness as the bus bar section A so that it forms with the bus bar section A a substantially flush T joint. This results not only in an improved electrical connection of negligible resistance between the bus bar section and conductor strip, but also reduces the width of the joint to a minimum so that the electrical clearance between the phases of the high voltage bus bars is increased at a given phase spacing.

Although in the example shown the conductor strip 12 is positioned within a shallow notch in the bus bar section, it shall be understood that the respective edges of the bus bar section and strip 12 may be directly joined by a welded union or the like.

The other end of the conductor strip 12 is directly welded or brazed, as at 15, to the supporting flange 16 of the stationary disconnect socket contact 8, the socket contact being of well known construction wherein a cylindrical member composed of copper or the like is slotted from the end, as at 17, and is surrounded by coiled or so-called garter springs 18 for insuring resilient engagement with the coacting plug contact. It will, therefore be noted that the most efficient electrical connection possible is provided between the bus bar sections, from which the electrical power to the feeders is distributed, and the stationary disconnect contacts coacting directly with the feeder circuit breakers. This obviously results in minimum heating which is an important consideration where large amounts of power are handled.

The cylindrical insulating shell 9 of phase A within which a disconnect socket contact 8 is positioned is provided with securing means comprising a supporting flange 19 seated upon an annular shoulder 20 formed within the insulating shell and secured to said shell as at 21 by cement or the like. The flange 19 as illustrated is seated within the shell at a point spaced from the upper end thereof. The socket contact 8 has rigidly secured thereto at its upper portion a disk 22 adapted to seat on the supporting flange 19. The disk 22 and flange 19 are suitably secured together, as at 23 (Fig. 1) by screws so that the disconnect socket contact 8 is centrally and rigidly mounted within the insulating shell 9.

The unit is insulated in the following manner: The bus bar section A intermediate the bare end portions provided for connection to bus bar sections of adjacent units, and a portion of the conductor strip 12 at the flush T joint above described, are covered with a molded insulation 24 substantially uniform in thickness so that a compact flush insulated T joint is provided. Such an insulated joint occupies less space and is more efficient than the bulky handtaped joint used heretofore.

In view of the fact that the conductor strip 12 must assume various shapes in order to provide for proper positioning of the corresponding bus bar the conductor strip from the aforesaid T joint to the disk 22 may be covered by flexible insulating tape 25 or the like as best illustrated in Fig. 1. The insulation of the unit is completed by the insulating shell 9 and a suitable insulating compound 26, such compound being generally of tarlike consistency, filling the space within the shell above the disk 22.

The insulating shells 9, 9' and 9" are each mounted in a common base member 13 as illustrated in Fig. 1. The base member 13, which is provided with a raised portion 13', receives each of the shells within a separate aperture in said portion. Each shell is united, as at 27, to the raised portion 13' by cement or the like which fills annular grooves in the coacting faces of the insulating shell and raised portion 13', respectively. The base member 13 is provided with securing means, as the bolts 28, for mounting the unit with respect to a wall 29 forming, for example, a part of a stationary metal clad unit. Accordingly, the phase bus bar sections and the associated stationary disconnect contacts form a complete insulated structural unit adapted to be mounted as such in a bus and switch station for coacting with the movable disconnect contacts of the circuit breaker. Likewise, the conductors 11 connected to the feeder circuits and the corresponding disconnect contacts and insulating shells are arranged in a similarly constructed unit. In this case the conductors 11 are generally connected to current transformers (not shown) in the feeder circuits, the unit in other respects being substantially identical with that above described.

Referring again to Fig. 1, the electrical connections to the circuit breaker contact structure comprise a pair of lead-in conductor studs 30, each stud being suitably provided with means for insulating and mounting the conductor stud with respect to the tank 3, as an insulating sleeve 31 and a supporting flange 32. The conductor stud 30 which comprises a continuous cylindrical conductor, either solid or tubular in form, has connected thereto at its lower end the circuit breaker contact structure 6. The insulating sleeve 31, which bears at its lower end on the contact structure 6 and is provided with an annular shoulder at 31' engaging a sleevelike extension 32' of the supporting flange 32, prevents movement of the conductor stud in a vertical direction upwardly, whereas an additional insulating sleeve 33 positioned between a nut 34 secured to the upper portion of the conductor stud and the flange 32 limits movement of the stud in the opposite direction.

The portion of the conductor stud 30 above the nut 34 is turned down so as to form the disconnect plug contact 7, the plug at its contact portion being provided with a conducting ring 7' preferably composed of silver. The interior contact surface of the coacting socket contact 8 is likewise provided with a silver coating for obtaining silver-to-silver contact. The outer surface of the ring or band 7' which is brazed, plated or otherwise suitably joined to the conductor stud is convex as illustrated so as to form with the coacting socket contact a high pressure line contact.

As in the case of the stationary disconnect contact structure, the movable disconnect contacts are directly electrically connected to the circuit controlling contact structure 5—6 so that no heating due to poor electrical unions results. The combined lead-in conductor stud and disconnect plug contact design therefore results in simplified disconnect contact and circuit breaker structure, and in more efficient electrical connections.

Accordingly, when the circuit breaker is elevated to its plugged-in or connected position the permanent portions of the circuit, that is the portions other than the extential disconnect contacts and circuit interrupting contact structures, comprise integral and continuous conductors free from the usual high resistance connections and adapted to carry relatively large currents without any trouble caused by overheating.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. An article of manufacture constituting polyphase switchgear apparatus arranged to be positioned as an individual unit in a polyphase bus and switch station, said switchgear apparatus comprising a plurality of phase disconnect contacts, a plurality of corresponding phase conductors, each connected at one end to a disconnect contact, said conductors adapted electrically to connect said disconnect contacts and corresponding phase bus-bar structure, a plurality of insulating cylinders open at one end within which said disconnect contacts are individually mounted, means insulating each of said disconnect contacts and conductors at one end of said cylinders, and a supporting plate common to said insulating cylinders within which the same are positioned and mounted for unit assembly within said bus and switch station.

2. An article of manufacture constituting polyphase bus bar and disconnect switch structure arranged to be positioned as an individual unit in a polyphase bus and switch station, said structure comprising a plurality of phase bus bar sections, each bus bar section comprising an integral conductor and having a conductor strip integrally connected thereto at one end of said strip, phase disconnect contacts integrally connected to the opposite ends of the corresponding strips, a plurality of insulating shells within which said disconnect contacts are mounted, respectively, and a supporting plate common to said insulating shells within which the same are mounted for unit assembly within said bus and switch station.

3. An article of manufacture constituting bus bar and disconnect switch structure arranged to be positioned as an individual unit in a bus and switch station, said structure comprising a continuous bus bar section, a conductor strip integrally connected at one end directly to said bus bar section, a disconnect contact comprising a socket member integrally connected to the other end of said conductor strip, the electrical connection between said bus bar section and socket member comprising an integral and continuous conductor, a cylindrical insulating shell within one end of which said socket contact is disposed, the other end of said insulating shell being open, means securing and positioning said socket contact within said shell, and means insulating said conductor strip at the said one end of said shell.

4. An article of manufacture constituting polyphase bus bar and disconnect switch structure arranged to be positioned as an individual unit in a polyphase bus and switch station, said structure comprising a plurality of phase bus bar sections, a plurality of conductor strips each integrally united at one end to a corresponding phase bus bar section, a plurality of stationary disconnect contacts, each integrally united to the other end of the corresponding phase conductor strip, the electrical connection between a bus bar section and corresponding stationary disconnect contact comprising an integral and continuous conductor, a plurality of phase insulating shells, each enclosing a stationary disconnect contact, means positioning said disconnect contacts within said shells, and a supporting plate common to said shells within which said shells are rigidly positioned for unit assembly of said structure, said bus bar sections being individually coated by a molded insulation, said conductor strips being individually covered with a flexible insulation and the upper ends of each of said shells containing an insulating compound.

5. As an article of manufacture for switchgear, a bus bar and associated disconnect contact unit comprising a flat bus bar section, a conductor strip corresponding in thickness to that of said bus bar integrally joined at one end to an edge of said bus bar by a welded union to form a substantially flush T-joint, a disconnect contact integrally joined by a welded union to the other end of said conductor strip, and a molded insulating structure substantially uniform in thickness surrounding said bus bar and conductor at said joint, said insulating structure forming with said bus bar and conductor an integral T-shaped connection joint substantially uniform in thickness.

6. In electrical switchgear including coacting disconnect contacts, stationary disconnect contact structure comprising a cylindrical insulating shell open at one end, a conductor terminating in a disconnect contact mounted within the opposite end of said shell, means rigidly securing said contact to said shell and closing the said shell at a point spaced from the corresponding end thereof, and an insulating compound filling the space within said shell between said securing means and the outer edge of the shell.

7. In electrical switchgear including coacting disconnect contacts, stationary disconnect contact structure comprising a cylindrical insulating shell open at its lower end, a conductor terminating in a disconnect contact extending through the opposite end of said shell so that said disconnect contact is positioned within said shell, a disk secured with respect to said contact cooperating with a corresponding retaining flange mounted within said shell for rigidly positioning said contact, said disk and retaining flange being spaced below the upper edge of said shell and an insulating compound filling the remaining space in the upper end of said shell.

8. Electrical switchgear of the draw-out type including stationary bus-bar and disconnect contact structure, said stationary structure comprising a bus bar, a conductor electrically connected to said bus bar, a disconnect contact connected to said conductor, an insulating shell forming a cylinder open at opposite ends, said disconnect contact extending within one end of said shell, means securing said contact within said shell at a point spaced from the end thereof, and an insulating material in the aforesaid end of said shell for insulating said conductor and disconnect contact.

CHARLES H. HILL.